United States Patent [19]
Plummer et al.

[11] 3,980,136
[45] Sept. 14, 1976

[54] FRACTURING WELL FORMATIONS USING FOAM

[75] Inventors: Ray A. Plummer; Charles W. Johnson, both of Houston, Tex.

[73] Assignee: Big Three Industries, Inc., Houston, Tex.

[22] Filed: Apr. 5, 1974

[21] Appl. No.: 458,298

[52] U.S. Cl. ............................ 166/280; 166/308
[51] Int. Cl.² ........................................ E21B 43/26
[58] Field of Search ............... 166/305 R, 308, 309, 166/280; 252/8.55 R

[56] References Cited
UNITED STATES PATENTS

| | | | |
|---|---|---|---|
| 3,075,581 | 1/1963 | Kern | 166/280 |
| 3,100,528 | 8/1963 | Plummer et al. | 166/308 |
| 3,108,636 | 10/1963 | Peterson | 166/308 |
| 3,136,361 | 6/1964 | Marx | 166/308 |
| 3,342,261 | 9/1967 | Bond | 166/305 R |
| 3,396,107 | 8/1968 | Hill | 166/308 |
| 3,486,560 | 12/1969 | Hutchison et al. | 166/308 |
| 3,572,440 | 3/1971 | Hutchison et al. | 166/309 |
| 3,664,422 | 5/1972 | Bullen | 166/308 |
| 3,937,283 | 2/1976 | Blauer et al. | 166/308 |

OTHER PUBLICATIONS

"After Frac with Nowsco Nitrogen", Petroleum Engineer, Jan., 1962, p. 149.

*Primary Examiner*—Ernest R. Purser
*Assistant Examiner*—Jack E. Ebel
*Attorney, Agent, or Firm*—Arnold, White & Durkee

[57] ABSTRACT

Foam fracturing fluids and methods for fracturing well formations using foam as the carrier for the propping agent are disclosed. The foams are stiff stable foams formed of a relative large amount of gas and a relative small amount of liquid. The foams are stable at surface pressures and remain stable when delivered into the well formation at the bottom of the well.

7 Claims, 3 Drawing Figures

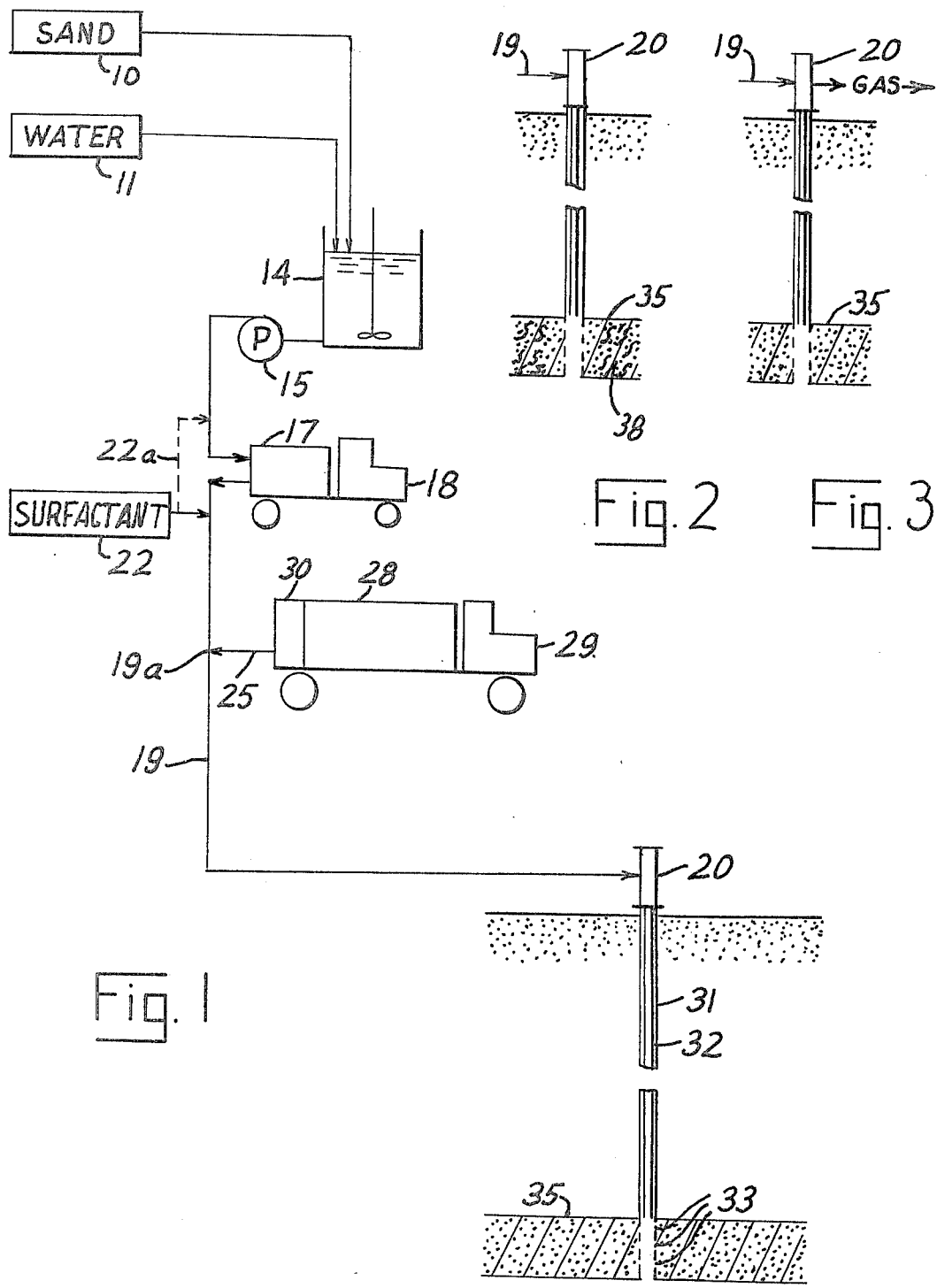

FRACTURING WELL FORMATIONS USING FOAM

BACKGROUND OF THE INVENTION

Fracturing of well formations is a very difficult art. According to the known procedures, the formation area which may be fractured by a fracturing treatment is limited. In order that the area of fracture may be increased, the fracturing fluid used must have a viscosity low enough to permit adequate penetration through the particular formation and at the same time high enough to prevent coefficient that excessive leak-off of fracturing fluid to the formation not occur. Fracturing fluids in the past have of necessity been formulated based on compromise between low viscosity for high formation penetration and high viscosity to prevent excessive leak-off of fracturing fluid. At the same time, the fluid must be capable of delivering the sand or other particulate matter into all parts of the fracture area. In other words, the sand should not fall from suspension in the fracturing fluid or the benefits of fracturing will not be fully realized.

In addition to the requirements of high formation penetration, low fluid loss, and satisfactory sand carrying ability of the fracturing fluid for a successful well fracturing operation, other factors are important. Well formations often contain materials which are sensitive to various liquids. In particular, the swelling clays are notably affected by water. Therefore, the amount of water used in fracturing these formations should be kept at a minimum. When a large amount of fracturing fluid (liquid) is employed in well fracturing operations, problems can occur in removing a sufficient amount of water from the formation following the fracturing treatment in order to secure adequate production from the well.

According to many well fracturing procedures, control of the fracturing operation is difficult. Not only are the factors mentioned above important, but adequate control of the fracturing fluid flow into the formation, and flow back out of the formation following completion of fracturing, is also important. The propping material must also be left in proper disposition in the formation to adequately increase production flow from the formation. The fracturing fluids afforded by this invention provide these controls, and in particular the invention affords full control of bleedback to the well of the fracturing fluid after fracturing is completed.

SUMMARY OF THE INVENTION

According to the invention, foam fracturing fluids and methods for fracturing well formations using such fluids are provided which permit increased formation penetration by the fracturing fluid, which provide low leak-off of the fracturing fluid, which provide substantially zero proppant settling in the fracturing fluid, and which cause minimal formation damage. The fracturing fluids of the invention are gas-in-liquid foams characterized by a very high foam quality, that is, the ratio of gas volume to the volume of the gas plus the liquids in the fracturing fluid is very high. These foams also have low viscosity, but at the same time have low fracturing fluid coefficients so that fluid leak-off during the fracturing operation is very low. In addition, when the foams are used as carriers for a propping agent, the settling rate of the proppant in the foams is zero or nearly zero, so dropout of the proppant from the fracturing fluid does not occur. Because of the low liquid content of the foams, there is less chance of swelling clays during fracturing treatments, and less damage to formations when water is used as the liquid component of the fracturing fluid. In addition, the high gas content of the foams allows for removal of most of the liquid from the formation after the fracturing treatment is completed. This results in faster starting of production from the well, and sometime eliminates the necessity for swabbing or pressure jetting to remove remaining water and other fluids from the formation. In addition, the gas outflow from the well following a fracturing treatment can be controlled at the surface of the well, in contrast to older methods where such control was either not satisfactory or impossible.

According to the preferred embodiment of the invention, a slurry of sand in water is pumped to a pressure sufficient to enter the well and then a relatively large amount of gas, preferably nitrogen but other gases may be used, is introduced into the pressured liquid to immediately form a very stable and stiff foam at the surface adjacent the well. A surface active agent such as soap or surfactant is added to the sand-water slurry before the gas is introduced, to assist in foam formation. Other materials, such as acids, salts, gels, polymers, and friction reducing agents, may be added to the water-sand slurry before foam formation. The foam quality may be from fifty percent (50%) to ninety percent (90%), foam quality being defined as the percentage of the volume of gas at the existing temperature and pressure to the volume of gas plus the volume of water plus the volumes of other liquid components of the foam. It has been found that if the foam quality is less than about 50 percent, a water phase may form, and if the foam quality is higher than about ninety percent, a gas phase may form. The deeper the well, and the higher the down-hole well pressure, the more gas is required at the surface to generate the same quality foam, because as the gas travels down the well it is compressed and diminishes in volume and therefore the physical properties, such as the quality of the foam changes.

The fracturing fluid is delivered into the well from the surface as a foam, and the foam quality is maintained down the well to the bottom of the well and into the formation. Usually, a volume of pressured gas, water and surfactant mixed as a foam is introduced into the formation ahead of the sand bearing foam as a pad. The sand bearing fracturing fluid is introduced at high pressure into the formation in the desired amount, to create the desired fracturing area around the well. A foam flush, formed of gas, water and surfactant is usually delivered into the well following the fracturing fluid, to flush sand from the well.

It is a feature of the invention that a substantially greater area may be fractured than with other methods. The low fracturing fluid coefficient of the foam prevents substantially all leak-off of the fracturing fluid into the formation, and the low viscosity permits greater lateral penetration through the formation. The sand carrying ability of the foam is very high, all of the sand therein being carried with the foam into the formation.

After introduction of the fracturing fluid is complete, with the sand distributed throughout the fractured area, the well is shut in until the pressure stabilizes. A small amount of nitrogen, or other gas employed in making the foam, is removed at the well head to cause breaking of the foam in the well, and to lower the pressure in the formation adjacent the well bore, thus allowing the formation to heal. The well is maintained in shutin condition for a period of time, usually from about twelve hours to about twenty-four hours, to allow the formation to heal (settle) due to the overburden above the formation. After the formation has healed, the well is opened to release the gas pressure at the formation. The pressure drop of the fracturing fluid in the formation breaks the foam in the formation, and the gas leaves the formation carrying with it substantially all of the water and other fluids originally contained in the fracturing fluid. If any water remains, it can be removed by a swabbing or jetting treatment in the well. Production from the formation can usually be commenced immediately, since no well cleaning procedure is usually required.

As has been mentioned earlier, in well formations having high sensitivity to liquids, particularly to water, damage to the formations is reduced because only a small amount of water is used in the fracturing fluids, and most of it is removed. The formation damage referred to is that caused by swelling of the so-called swelling clays in the formation.

Substantially complete removal of water following the fracturing treatment occurs because of the high foam quality, that is, the large volume of gas contained in the foam. Because of the substantially complete water removal from the formation and well, production from the well starts sooner that with other methods, and swabbing or jetting procedures necessary to start production from the well are in most cases eliminated. Since the fracturing fluid is composed mainly of gas, the rate of bleed back of the fracturing fluid from the well can be satisfactorily controlled at the surface.

A principal object of the invention is to provide improved well formation fracturing methods. Another object of the invention is to provide such methods which are safe, economical, and dependable. A still further object of the invention is to provide such well fracturing methods which yield improved results, and which are capable of fracturing greater formation areas around a well, with less loss of fracturing fluid than with other methods, and with less damage to the formations.

Other objects and advantages of the invention will appear from the following detailed description of preferred embodiments, reference during the description being made to the accompanying drawings.

BRIEF DESCRIPTIONS OF THE DRAWINGS

FIG. 1 is a schematic flow diagram showing a preferred method of formation fracturing according to the invention.

FIG. 2 is a partial schematic flow diagram illustrating a step of the preferred method.

FIG. 3 is a partial schematic flow diagram illustrating another step of the preferred well fracturing treatment.

DESCRIPTION OF THE PREFERRED EMBODIMENTS

Describing the preferred embodiments according to the invention in detail, and referring first to FIG. 1 of the drawings, the well formation fracturing fluid is prepared by mixing sand from a source 10 with water from a source 11. Sources 10 and 11 may be any suitable sources of sand and of water, having suitable properties for their intended uses. Instead of sand, other solid particulate propping material known in the art, such as glass beads, may be used. The sand or other partculate material is usually between about eight mesh and about forty mesh in size, U.S. standard sieve size.

The sand and water are delivered into a mixing device 14 which may be of any suitable type. Propeller mixers as illustrated, or mixers utilizing augers, or any other suitable form of mixer may be used. From mixer 14, the sand-water slurry is delivered by pressurizer pump 15 to high pressure fluid pump 17. Pump 17 is shown to be mounted on a truck 18, but may be supported in any other suitable manner at the well site. High pressure sand slurry is delivered from pump 17 through a conduit 19 to the well head 20. Soap or surfactant from source 22 is admixed with the sand slurry delivered from high pressure pump 17. The soap or surfactant may alternatively be admixed with the sand slurry ahead of pump 17, as indicated by dashed line 22a. Other conditioning and treating materials for the fracturing fluid, such as acids, salts, gels, polymers, friction reducing agents, or others, may be added at the water source 11 to improve the quality of the fracturing fluid.

Acids added to the fracturing fluid assist in preventing swelling of clays. Hydrochloric acid and acetic acid are frequently used for this purpose. Salts, for example potassium chloride, also prevent clay swelling. Gels, for example Guar gum, are useful for holding the sand suspended in the sand-water slurry prior to foam formation. Oil may be added to the foam-water slurry as a lubricant and to prevent clay swelling; oil may replace all of the water in the sand slurry, in which case a chemical suitable for foaming oil is used in place of the surfactant 22. Other friction reducing materials may be added to the fracturing fluid.

High pressure gas introduced through conduit 25 is admixed with the sand slurry. High pressure nitrogen gas is preferred, but other gases may be used. Substantially any gas may be used, but among the most useful are the inert gases, carbon dioxide, air, natural gas, cumbustion or flue gases, or mixtures of any of the gases mentioned. Use of nitrogen gas is preferred since it is inert and because it may readily be provided at high pressures.

Tank 28 of tank truck 29 contains liquid nitrogen, which may be readily converted to high pressure gaseous nitrogen by pumping and heating of the liquid in unit 30 of the tank truck, as is well understood by those skilled in the art. Nitrogen gas at extremely high pressures (20,000 psia) may be readily prepared in this manner. Use of other gases, while satisfactory to the process, may be more difficult and may require the use of high pressure compressors or vaporizers to obtain the gas pressures required.

The introduction of the high pressure gas at point 19a of conduit 19 immediately converts the sand slurry to a stiff stable foam. The amount of gas in the foam is expressed in terms of foam quality, which is defined as the volume of gas at the existing temperature and pressure at the well formation or reservoir at the bottom of the well, divided by the same gas volume plus the volume of the water, surfactant or soap, plus the volumes of all other liquid materials contained in the fracturing fluid, times 100, expressed as percentage. The foam quality, according to the invention, should be between 50 percent and 90 percent. The ratio of gas to liquid in the fracturing fluid may be expressed in other terms, for example, the fracturing fluids may contain from about one thousand standard cubic feet of nitrogen or other gas per barrel of water from source 11 to about twenty thousand standard cubic feet of nitrogen or other gas per barrel of water, or even higher.

Well formations are at elevated pressures, largely proportional to well depth, and the amount of gas in the foam must be greater at greater depths and reservoir pressures in order to obtain the same foam quality. The gas volume shrinks under higher pressure, while the volume of the other components of the fracturing fluid remain substantially constant regardless of pressure. Therefore, as gas volume shrinks at higher pressure, more gas is required to obtain the gas volume required for any particular foam quality percentage.

The stiff stable foam prepared in conduit 19 by gas introduction at point 19a is delivered through conduit 19 to well head 20. The well head and well conduits as shown in the drawings are schematic, and not intended to depict an actual well structure. The equipment downhole and at the top of the well may be any suitable equipment known in the art. The foam pad, the sand bearing foam prepared as heretofore described, and the foam purge, are introduced down the well usually through a production tubing or casing in the well. According to pressure and temperature conditions in the well, and according to calculations based on the area around the well to be fractured and the fracture thickness, a prescribed amount of fracturing fluid is introduced from the well into the formation through casing perforations at the formation. In the drawing, there is shown a single casing 31 and a single tubing 32, the casing 31 having perforations 33 at formation 35. The fracturing fluid in the form of the stiff stable foam previously described is introduced down through tubing 32 and/or casing 31 and out through perforations 33 into reservoir 35. The foam as introduced into the reservoir has a foam quality between fifty percent and ninety percent, as heretofore defined. Because the foam has a relatively low density compared with the densities of other fracturing fluids, and because the fracturing fluid pressure in the well at the level of the formation must exceed the formation pressure, the foam as prepared at the surface and introduced down through the well must be at a pressure which will give the required pressure downhole at the formation. Therefore, the gas introduced at point 19a must be at a sufficiently high pressure to give the required downhole pressure in excess of formation or reservoir pressure. That is why the gas delivered from conduit 25 is preferably nitrogen gas prepared as heretofore described, since such high gas pressure is easier to achieve by this method than by the use of pressured or compressed gases or air.

The fracturing fluids herein described have better fracturing fluid coefficients than most other fracturing fluids known in the art. The fracturing fluid coefficient depends not only on the characteristics of the fracturing fluid used, but also on the characteristics of the reservoir fluids and rock. A high coefficient means high fluid-loss properties. A low coefficient means low fluid-loss properties and thus a larger fracture area for a given volume and injection rate of fracturing fluid. For any specified condition of reservoir fluid characteristics and rock characteristics, the fracturing fluid coefficient depends primarily on the fracturing fluid characteristics. A higher rate of fracturing fluid injection increases fracture area, as does lengthened pumping time using a greater volume of fracturing fluid.

After the full calculated or estimated volume of foam fracturing fluid has been introduced into the formation, a small amount of gas pressure may be bled from the well to cause the foam within the well to break, leaving the well filled with gas under pressure, the formation fracture area remaining filled with foam. The well is then shut in and maintained shut in for a period of time sufficient to permit healing of the formation. By healing, it is meant that the overburden above the formation settles, partially reducing the formation volume as increased by fracturing fluid introduction. The formation healing stabilizes the sand introduced within the formation by the foam fracturing fluid. After the formation has healed the well is opened, the pressure drop in the formation causing the foam in the formation to break. The high pressure gas leaving the formation usually carries from the well substantially all of the liquids present in the fracturing area, leaving the formation and well clean and ready for commencement of production from the well. Because of the increased fracture area, and because the sand or other propping agent is uniformly distributed throughout the fracture area, and because of the fact that the sand does not settle from the foam fracturing fluid and is carried to the full extent of the fracture area, the production from the well is greatly increased.

FIG. 2 illustrates the well and formation after bleeding off of pressure to break the foam in the well, during the formation healing period.

FIG. 3 illustrates the well and formation following formation healing, with the gas and contained liquids being purged rom the formation and well.

The foam in formation 35 is indicated by reference numeral 38.

The amount of sand in the sand-water slurry may be varied to give the desired amount of sand in the foam fracturing fluid. The sand-water slurry at the mixer may contain from nearly zero pounds of sand or other proppant per gallon of water up to as many pounds of sand or proppant per gallon of water as may be pumped. The amount of sand in the foam fracturing fluid downhole may contain from about one-fourth pound of sand or other proppant per gallon of foam up to as much as can be pumped into the formation without screen out occuring at the formation face, depending upon reservoir conditions.

In an exemplary well fracturing treatment according to the invention, in a well having a depth of 7400 feet, the sand-water slurry contained from three to four and one-half pounds of sand, 20–40 mesh, per gallon of water at the mixer. A total amount of 4494 gallons of water was used in foam production, using 535,000 standard cubic feet of nitrogen gas to yield about 643 barrels (27,000 gallons) of foam fracturing fluid, including the pad and flush, at formation pressure, containing a maximum of 0.70 pounds of sand per gallon of foam. A foam pad (96 barrels) was first introduced into the formation, using 80,000 standard cubic feet of nitrogen gas commingled with 16 barrels of treated water. This was followed by injection of the foam facturing fluid (21,100 gallons) into the formation at an injection rate of 20 barrels (42 gallons/barrel) per minute, the total injection time being about 32 minutes, at a surface pressure of 4000 psi. The well was flushed with 43 barrels of foam (no sand) using 35,000 standard cubic feet of nitrogen gas. Ten gallons of stable foam surfactant per 1000 gallons of water was used in foam generation. The calculated diameter of the fracture area based on experience gained in field operation (excluding the nitrogen pad), was about 5000 feet, with a fracture height of about 12 feet. After completion of foam injection, nitrogen was bled off from the well head to break the foam in the well, and then the well was shut in and the formation was allowed to heal for twelve hours, after which the well was opened to break the foam in the formation and to purge the gas from the formation and well. Following this, production from the well was commenced, no swabbing or other well cleaning operation having been necessary. The well, a gas well, had produced 70,000 standard cubic feet per day prior to the fracturing treatment. After the fracturing treatment, the well production was 1,800,000 standard cubic feet per day.

Comparable results are obtained in both gas wells and oil wells.

To summarize, the invention provides a formation fracturing fluid, comprising a pressured stable foam comprising a liquid carrier comprising one or more liquids selected from the group consisting of water and oil, and a solid proppant comprising one or more materials selected from the group consisting of sand, crushed rock, glass, glass beads, and nut hulls, and a surface active material comprising one or more materials selected from the group consisting of soaps and surfactants, and gas comprising one or more gases selected from the group consisting of nitrogen, carbon dioxide, air, natural gas, and combustion exhaust gases, and having a percentage ratio, volume of gas; volume of gas and liquids in the foam between about 50% and about 90% at a well formation pressure, and methods for performing fracturing treatments using the same.

It will be realized that the fracturing treatments will be varied according to well depth and pressure, nature of the formation and formation fluid, area and depth of fracture, and the like.

While preferred embodiments of the invention have been described and illustrated in the drawings, many modifications thereof may be made by a person skilled in the art without departing from the spirit of the invention, and it is intended to protect by Letters Patent all forms of the invention falling within the scope of the following claims.

We claim:

1. Method for facturing well formations comprising
generating under high pressure at the well surface a stable gas-in-liquid foam facturing fluid having solid propping material uniformly suspended therein and having a prescribed foam quality in the range of from about 50% to about 90%;
delivering said foam fracturing fluid to the well while at the same time adjusting the amount of high pressure gas in said foam to maintain the prescribed foam quality as the foam reaches downhole and formation pressures;
forcing a prescribed amount of said foam fracturing fluid from the well into the formation surrounding the well casing at a pressure sufficient to effect fracturing of said formation;
bleeding gas pressure from the well head sufficient to cause the foam within the well to break and to leave the well filled with gas under pressure and the formation fracture area remaining filled with foam;
shutting in the well until the formation has healed, and thereafter releasing the well pressure at a rate sufficient to break the foam in the formation and purge the well and formation of substantially all gas and liquid while leaving the propping material distributed throughout the fracture area.

2. Method according to claim 1 wherein said gas is selected from the group consisting of nitrogen, carbon dioxide, natural gas, air, and combustion exhaust gases.

3. Method according to claim 1, wherein the liquid component of said foam comprises at least one liquid selected from the group consisting of water and oil.

4. The method of claim 1 wherein the liquid component of the foam is water.

5. The method of claim 4 wherein the gas is nitrogen.

6. Method according to claim 1 wherein said solid propping material is selected from the group consisting of sand, crushed rock, glass, glass beads, and nut hulls.

7. The method of claim 1 wherein the well is treated prior to fracturing with a foam pad in order to seal the formation and prevent excessive leak off of pressure from the formation during the fracturing operation.

* * * * *

UNITED STATES PATENT OFFICE
CERTIFICATE OF CORRECTION

Patent No. 3,980,136  Dated September 14, 1976

Inventor(s) Ray A. Plummer et al.

It is certified that error appears in the above-identified patent and that said Letters Patent are hereby corrected as shown below:

Column 6, line 38, between the words "or" and "proppant" the word -- other -- should be inserted.

Signed and Sealed this

Fourth Day of January 1977

[SEAL]

Attest:

RUTH C. MASON
*Attesting Officer*

C. MARSHALL DANN
*Commissioner of Patents and Trademarks*